United States Patent

Kaneko et al.

[11] 3,804,351
[45] Apr. 16, 1974

[54] MAGAZINE

[75] Inventors: Keiji Kaneko, Minami Ashigara-Machi; Yasutoshi Okuzawa, Tokyo; Saburo Numata, Omiya, all of Japan

[73] Assignee: Fuji Photo Film Co., Ltd., Kanagawa, Japan

[22] Filed: July 15, 1971

[21] Appl. No.: 162,899

[30] Foreign Application Priority Data
July 15, 1970   Japan.............................. 45-61862

[52] U.S. Cl.............................. 242/199, 242/71.2
[51] Int. Cl. ......................................... G11b 23/10
[58] Field of Search ........ 242/199, 200, 71.2, 84.8, 242/197, 198

[56] References Cited
UNITED STATES PATENTS
1,315,650   9/1919   Akeley........................... 242/71.2
1,942,869   1/1934   McMaster....................... 242/71.2
2,175,538   10/1939  Morsbach et al................ 242/71.2
3,111,281   11/1963  Sinkewitsch..................... 242/200
3,463,416   8/1969   Quenot............................ 242/84.8
3,606,194   9/1971   Quenot............................ 242/84.8

Primary Examiner—John W. Huckert
Assistant Examiner—John M. Jillions
Attorney, Agent, or Firm—Sughrue, Rothwell, Mion, Zinn and Macpeak

[57]   ABSTRACT

A magazine for a movie film or magnetic recording tape having a flangeless take-up shaft has a leaf spring for preventing the film or tape from loosening when winding of the tape by always lightly depressing the edge of the film or tape at the outermost periphery of the winding regardless of the diameter of the winding.

3 Claims, 13 Drawing Figures

MAGAZINE

BACKGROUND OF THE INVENTION

1. FIELD OF THE INVENTION

This invention relates to a magazine, and more particularly to a magazine for a movie film, magnetic recording tape and the like (hereinafter referred to as tape).

2. DESCRIPTION OF THE PRIOR ART

Cameras, movie projectors, magnetic tape recorders, etc., having a film magazine for movie, magnetic tape cassette films, as a tape and the like therein, have prevailed recently, but these magazines have disadvantages such that when the tape is fed at high speed or is stopped at once and thereafter is fed again, it fluctuates laterally at the take-up shaft side so as to loosen the winding. This occurs when the tape is fed at increasing speed or is once stopped, slight slack of the tape is produced at the take-up shaft side, due to the irregularity of the thickness of the tape.

Such lateral loosening of the winding of the tape enlarges the width of the winding of the tape around the take-up shaft so that when the width of the tape winding fully fills the inner width of the magazine, it increases the friction between the tape winding and the inner wall of the magazine so as to stop the rotation of the take-up shaft. In case of movie film, the film is forcibly pushed into the take-up side by claws, on the other hand, since the take-up shaft is not rotated, the film is accumulated in the take-up chamber with the result that the claws finally break the perforations of the film.

Such loosening of the lateral direction of the tape within the magazine is extremely detrimental in operation of the tape, particularly for speed-up of the tape.

It is an object of the present invention to provide a magazine for a tape and the like adapted for high speed operation of the tape without loosening the winding in the lateral direction of the tape and the like.

According to the present invention, the magazine of this invention has a characteristic feature to remove such detriments by a simple structure.

SUMMARY OF THE INVENTION

According to the present invention, there is provided a tape magazine and the like having a flangeless take-up shaft which comprises a leaf spring for preventing the tape and the like from loosening during winding of the tape by always lightly depressing the edge of the tape or the like at the outermost periphery of the winding regardless of the winding diameter.

BRIEF DESCRIPTION OF THE DRAWINGS

The other objects, features and advantages of the present invention will become apparent from the following description taken in conjunction with the accompanying drawings, in which.

DESCRIPTION OF THE PREFERRED EMBODIMENT

Figure 1:
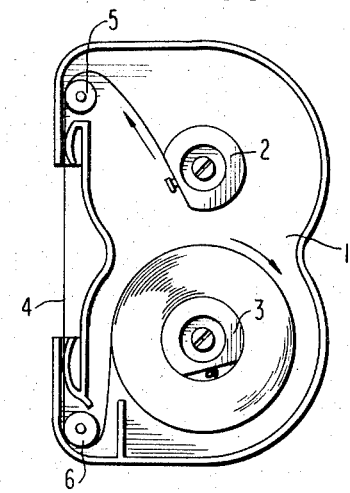
FIG. 1 is a plan view of the magazine body showing the interior of the movie film magazine for explanatory purpose of the invention.

Reference is now made to the drawings, particularly to FIG. 1, of the magazine body showing the interior of the movie film magazine and the present invention will be described with reference to one embodiment applied for the movie film.

Figure 2:
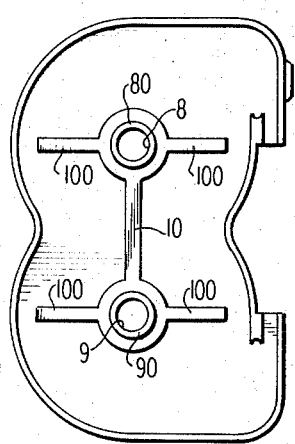
FIG. 2 is a plan view of a cover constructed according to the present invention to cover the magazine body shown in FIG. 1.

Movie film magazine body 1 has a film supply shaft 2 and a take-up shaft 3 rotatably provided for winding the film 4. Reference numerals 5 and 6 illustrate guide rollers. The magazine body 1 is covered with a magazine cover 7 shown in FIG. 2. The cover 7 protects the film within the magazine body 1 by shielding the light and supporting the winding shafts 2 and 3 with ribs 80 and 90 provided cylindrically around the holes 8 and 9.

Figure 4:
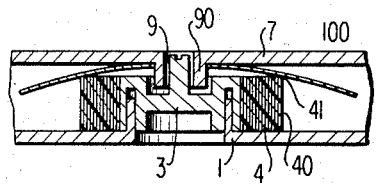
FIG. 4 is a side sectional view of a portion of the magazine taken along the line IV—IV in FIG. 3.
Figure 3:
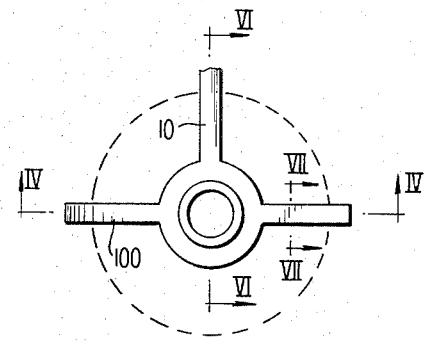
FIG. 3 is a fragmentary view of a portion of a leaf spring provided on an interior of the cover.
Figure 5:
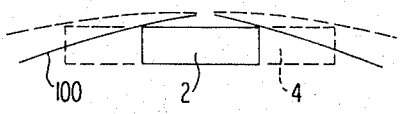
FIG. 5 is a side explanatory view of the leaf spring in operation.
Figure 7A:
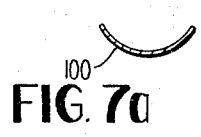
FIGS. 7a–7d are sectional views of the different embodiments of the leaf spring taken along the line VII—VII in FIG. 3.
Figure 7B:
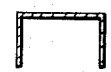
Figure 7C:
Figure 7D:
Figure 9:
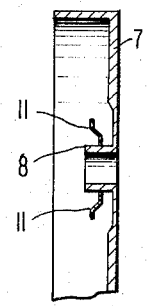
FIG. 9 is a side sectional view of a portion of the cover taken on the plane of the line IX—IX in FIG. 8.

A depressing member 10 for tape and the like having a leaf spring 100 for preventing the tape and the like from loosening the winding of the tape is provided with the cover 7. The leaf spring 100 lightly depresses the upper edge 41 of the outermost turn 40 of the winding of the film 4 wound on the take-up shaft 3 as shown in FIG. 4. The leaf spring 100 has resiliency so as to always depress the upper edge of the film turn 40 at the outermost periphery of the winding of the film regardless of the diameter of the winding of the film 4 as shown in FIG. 5.

Figure 6:
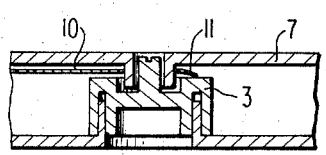
FIG. 6 is a schematic side sectional view of the magazine taken along the line VI—VI in FIG. 3.

The depressing member 10 has a portion 11 bent downwardly as shown in FIG. 6 so as to stabilize the take-up shaft upon depression of the upper surface of the take-up shaft 3. This configuration is not limited to that shown in the drawings. The section of the leaf spring 100 for preventing the tape and the like from loosening the winding may take any configuration such as shown in FIGS. 7a, 7b, 7c and 7d. Preferably, film magazine body 1 is also provided with an inwardly directed annular rib at the two shaft locations and both shaft 2 and shaft 3 which are cylindrical in form are provided with annular recesses which receive the rib and upon which the shafts rotate, while each shaft is provided with an axial projection facing away from the side carrying the annular recess and projecting through the opening within the cover 7 formed by inwardly projecting ribs 80 and 90, thus permitting mechanical connection to the shafts for driving the same. This permits depressing member 10 to be mounted on spaced ribs 80 and 90 by means of the circular openings within the same.

The number of leaf springs 100 may not always be two at the film supply and take-up sides as shown in the drawings, but may only be one or may be three or more. It is not necessary to provide a spring at the supply side for a magazine which is not rewound.

Material of the leaf spring 100 may not be limited to metal, but may be any material such as plastic having resiliency for always lightly depressing the upper end of the film at the outermost periphery of the winding regardless of the diameter of the winding of the tape as aforementioned.

Figure 8:
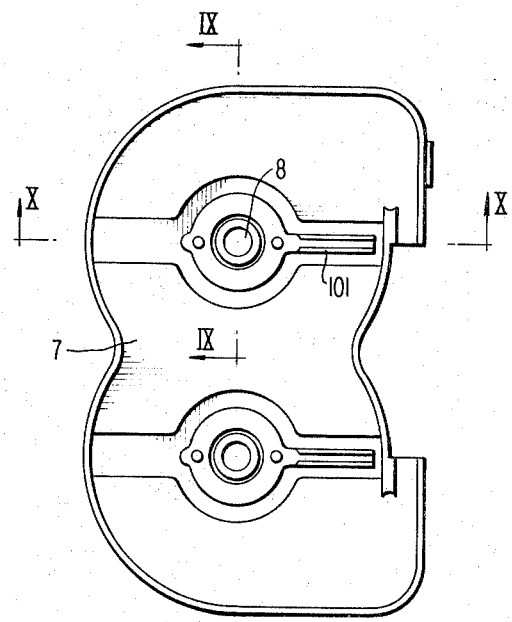
FIG. 8 is a plan view of the cover of another embodiment according to the present invention.
Figure 10:
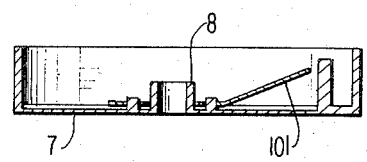
FIG. 10 is a side sectional view of a portion of the cover taken on the plane of the line X—X in FIG. 8.

FIGS. 8 and 10 show a cover provided with one leaf spring 101 in each side. The leaf spring is fixed on a dent within the interior of the cover near the rib.

Though the magazine of this invention is an extremely simple structure as described above, even if the running speed of the film is increased to 80 frames per second in case of 8 mm film, there occurs no loosening of the tape as occurs in the conventional film magazine, but the film is clearly wound without breaking the perforation of the film. Even if the film is at once stopped during feed and then again fed continuously, there occurs no lateral loosening of the film.

Thus, it should be understood from the foregoing description that the magazine of this invention provides extremely simple structure so that it may enable high speed feeding difficult heretofore to do of the magazines of this type.

What is claimed is:

1. In a magazine for housing a movie film or magnetic recording tape of the type having a cover member overlying the opening within a magazine body, the improvement comprising: said body including spaced annular ribs extending inwardly of the wall of said body facing said cover, cylindrical flangeless shafts including annular recesses for receiving respective ribs, said shafts acting to take up and supply film or tape wound thereon, spring means carried by said cover and overlying said shafts, said spring means including at least two angularly displaced radial leaf springs at each shaft location for lightly depressing one edge of the film or tape at the outermost periphery of the windings on respective shafts regardless of the diameter of the winding and said spring means further including a portion acting on each shaft for maintaining said shaft respectively on said ribs.

2. The magazine as claimed in claim 1, wherein said cover includes an inwardly directed annular rib at each shaft location, said spring means is formed of sheet material including an opening at each shaft location for receiving said cover rib and said shaft includes an axial projection received within said each cover rib.

3. The magazine as claimed in claim 1, wherein said spring means comprises a unitary sheet metal member having a portion extending between shaft locations.

* * * * *